(12) United States Patent
Cho et al.

(10) Patent No.: US 6,510,126 B1
(45) Date of Patent: Jan. 21, 2003

(54) OPTICAL DISC HAVING TEXTURED STRUCTURE, AND A METHOD OF MANUFACTURING THE OPTICAL DISC

(75) Inventors: Byung-Il Cho, Sungnam (KR); Chul-Woo Lee, Sungnam (KR); Kun-Ho Cho, Suwon (KR); Seung-Tae Jung, Sungnam (KR); Cheol-Seung Yeon, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/389,022

(22) Filed: Sep. 2, 1999

(30) Foreign Application Priority Data

Oct. 12, 1998 (KR) .......................................... 98-42488

(51) Int. Cl.⁷ ................................................ G11B 7/24
(52) U.S. Cl. ................... 369/275.1; 369/277; 369/283; 428/64.1
(58) Field of Search ....................... 369/14, 290, 275.1, 369/275.3, 275.4, 288, 283, 275.2, 112.23, 44.23, 44.14, 280, 300, 277; 428/64.1, 65.3, 64.4, 141; 700/166; 73/1.89

(56) References Cited

U.S. PATENT DOCUMENTS

| | | | | |
|---|---|---|---|---|
| 5,108,781 A | * | 4/1992 | Ranjan et al. ............... | 427/556 |
| 5,353,278 A | * | 10/1994 | Murakami et al. ........... | 369/290 |
| 5,586,040 A | * | 12/1996 | Baumgart et al. ........... | 700/166 |
| 5,681,636 A | * | 10/1997 | Marshall ..................... | 428/65.3 |
| 5,904,969 A | * | 5/1999 | Kamezaki et al. .......... | 428/64.1 |
| 6,127,017 A | * | 10/2000 | Hirata et al. ................ | 428/64.1 |
| 6,132,843 A | * | 10/2000 | Kuroda et al. .............. | 428/141 |
| 6,236,634 B1 | * | 5/2001 | Lee et al. ................. | 369/12.23 |

FOREIGN PATENT DOCUMENTS

| | | |
|---|---|---|
| JP | 4-325939 | 11/1992 |
| JP | 7-182655 | 7/1995 |
| JP | 8-77554 | 3/1996 |
| JP | 8-241520 | 9/1996 |
| JP | 9-22538 | 1/1997 |
| JP | 9-282649 | 10/1997 |
| JP | 10-79137 | 3/1998 |
| JP | 10-208226 | 8/1998 |
| JP | 10-255256 | 9/1998 |

* cited by examiner

Primary Examiner—Ali Neyzari
(74) Attorney, Agent, or Firm—Staas & Halsey LLP

(57) ABSTRACT

An optical disc for an optical near-field recording having a surface with a textured structure formed with a plurality of bumps and craters, and a method of manufacturing the optical disc. An optical flying head has a slider which contacts the bumps when in a parking zone (non-moving state) so that a contact area between the optical disc and the optical flying head is reduced. Accordingly, a stiction force is reduced, so that the wear and damage to the optical disc having the textured structure and to the optical flying head are minimized.

22 Claims, 4 Drawing Sheets

OPTICAL DISC HAVING TEXTURED STRUCTURE, AND A METHOD OF MANUFACTURING THE OPTICAL DISC

CROSS-REFERENCE TO RELATED APPLICATIONS

This application claims the benefit of Korean Application No. 98-42488, filed Oct. 12, 1998, in the Korean Patent Office, the disclosure of which is incorporated herein by reference.

BACKGROUND OF THE INVENTION

1. Field of the Invention

The present invention relates to an optical recording medium for an optical near-field recording in which a data erasure and re-recording is possible, and more particularly, to an optical disc of a textured structure preventing a stiction by forming the structure of a number of bumps and craters, with a lubricant film, and a method of manufacturing the optical disc.

2. Description of the Related Art

An optical near-field recording drive combines a hard disc drive technology with an optical recording technology, to thereby enable data to be recorded, erased and reproduced with respect to an optical disc. Here, a near-field means a field where the distance between an optical flying head and a surface of an optical disc is close as much as possible to 20–300 nm. A near-field recording means that data can be recorded and reproduced with respect to the optical disc under the condition that the optical flying head and the optical disc are close as much as possible the above distance. The optical flying head comprises a slider containing a magnetic coil, an objective lens mounted on the slider and a small lens.

FIG. 1 is a view showing an optical disc 14 for an optical near-field recording and an optical flying head 10 comprising a slider 13 containing a magnetic coil, an objective lens 11 and a small lens 12. As shown in FIG. 1, the optical disc 14 comprises a substrate, a reflective film, an insulation film, a recording film and a protective film, in that order from the lowest layer (furthest from the optical flying head 10) to the topmost layer (nearest the optical flying head 10). Here, the material of the substrate is plastic, that of the reflective film is aluminum (Al), that of the insulation film is SiNx, that of the recording film is TbFeCo, and that of the protective film is SiNx. A number of V-shaped grooves are formed on the substrate, and the V-shaped grooves are formed by injection molding. That is, if a fused plastic substrate is injection molded by a stamper for V-shaped grooves, V-shaped grooves are formed on the substrate.

FIG. 2 shows a substrate on which V-shaped grooves are formed. In FIG. 2, the width of the groove is 0.3~0.4 μm, the depth of the groove is 500~700 Å and the width of the land is 0.3~0.4 μm and the track pitch is 0.6~0.8 μm.

FIG. 3 shows that the slider 13 of the optical flying head 10 rests on the surface of the optical disc 14. In FIG. 3, a multilayer, including the reflective film, insulation film recording film and protective film, formed on the substrate is not shown and V-shaped grooves are formed on the substrate.

When the above-described optical near-field recording drive (hereinafter called a drive) does not perform recording and reproduction operations of data with respect to the optical disc 14, the slider 13 is positioned at a stop state on the surface (which is not shown but is called a parking zone) of the inner diameter side of the optical disc 14. When the drive performs recording and reproduction operations with respect to the optical disc 14, the optical disc 14 rotates at several thousand RPM (rotations per minute), and the slider 13 is floated from the surface of the optical disc; 14 to be spaced by a distance of 20~300 nm at the parking zone by a floating force of air swiftly passing between the grooves formed on the bottom of the slider and the surface of the optical disc, and then moves toward the outer diameter side of the optical disc 14.

However, when the optical disc 14 starts to rotate, although the slider 13 should be floated from the parking zone of the optical disc 14, the slider 13 is not floated because of a stiction force acting between the bottom surface of the slider 13 and the surface of the optical disc 14. Thus, a stiction such that the slider 13 does not move off from the parking zone of the optical disc 14 frequently occurs.

As a result, wear, friction and crash occur between the slider 13 and the optical disc 14 due to the above stiction, by which data recording on the optical disc 14 is not only lost but also the optical flying head 10 is damaged.

SUMMARY OF THE INVENTION

To solve the above problems, it is an object of the present invention to provide an optical disc in which a textured structure having a number of bumps and craters are formed on a substrate of the optical disc so that a slider of an optical flying head contacts the bumps of the optical disc, thereby reducing a mutual contact area between the optical disc and the slider, and also a lubricant film is formed on a protective film which is formed on the textured structure of the substrate so that a stiction force is reduced, thereby preventing a stiction between the slider and the optical disc, and a method of manufacturing the optical disc.

Additional objects and advantages of the invention will be set forth in part in the description which follows and, in part, will be obvious from the description, or may be learned by practice of the invention.

To accomplish the above and other objects and advantages of the present invention, there is provided an optical disc for an optical near-field recording using an optical flying head, the optical disc including the substrate having a textured structure with a plurality of craters and bumps; and the multilayer formed on the substrate, on the topmost of which a lubricant film is formed, wherein the optical flying head contacts the bumps.

To further accomplish the above and other objects and advantages of the present invention, there is provided a method of manufacturing an optical disc for an optical rear-field recording using an optical flying head, comprising forming a stamper for a textured structure having a number of craters and bumps; forming a substrate of the textured structure using the stamper; and forming a multilayer on the substrate on which the textured structure is formed, the multilayer having a lubricant film formed on a topmost of the multilayer, wherein the optical flying head is to contact the bumps.

BRIEF DESCRIPTION OF THE DRAWINGS

The above and other advantages of the present invention will become more apparent by describing in detail the structures and operations of the present invention with reference to the accompanying drawings, in which.

DESCRIPTION OF THE PREFERRED EMBODIMENT

Figure 1:
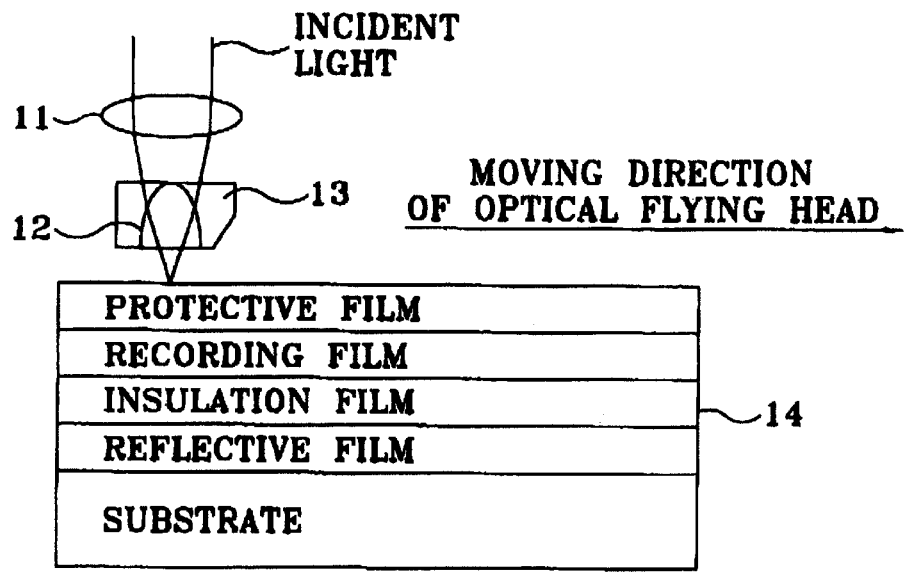
FIG. 1 shows a conventional optical disc and optical flying head.
Figure 2:
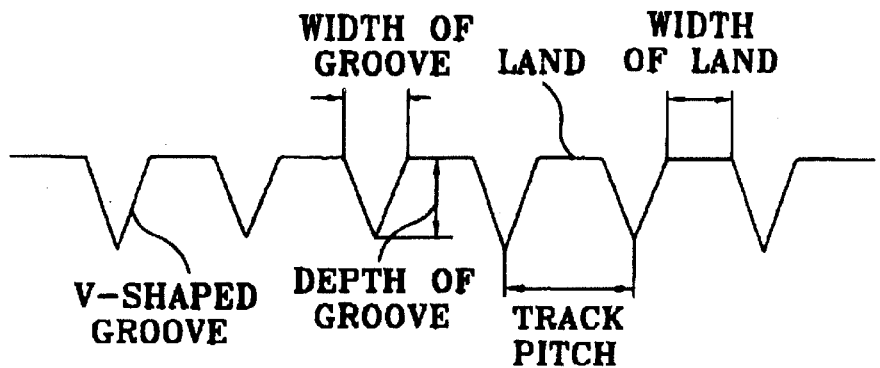
FIG. 2 shows a substrate of the conventional optical disc shown in FIG. 1.
Figure 3:
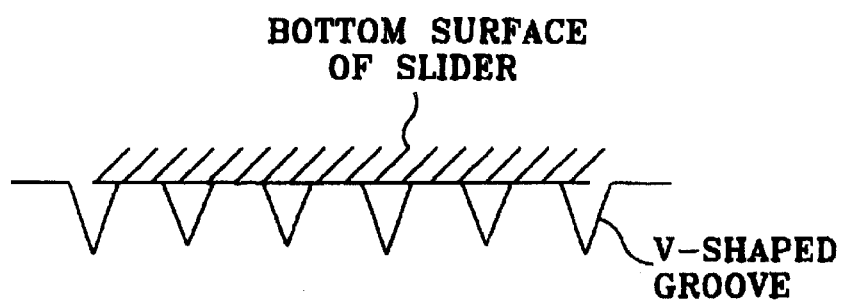
FIG. 3 shows a slider stopped on a surface of the conventional optical disc shown in FIG. 1.

Reference will now made in detail to the present preferred embodiments of the present invention, examples of which are illustrated in the accompanying drawings, wherein like reference numerals refer to the like elements throughout. The embodiment is described below in order to explain the present invention by referring to the figures.

In order to fabricate an optical disc having a textured structure according to an embodiment of the present invention, a stamper for a textured structure for forming the textured structure on the optical disc is fabricated first. A laser beam of a laser source Nd:YVO$_4$ is scanned on a stamper for V-shaped grooves attached to a movable spindle, so that a number of bumps and craters is formed on the stamper for the textured structure. Here, the wavelength of the laser beam is 1064 nm and the repetition rate of the laser beam is 10~100 kHz, the scanning interval of the laser beam is 20~80 ns, and the energy of the laser beam is 0~40 mW. Thus, if the laser beam is focused on the surface of the stamper, a number of spiral bumps and craters are formed.

Figure 4:
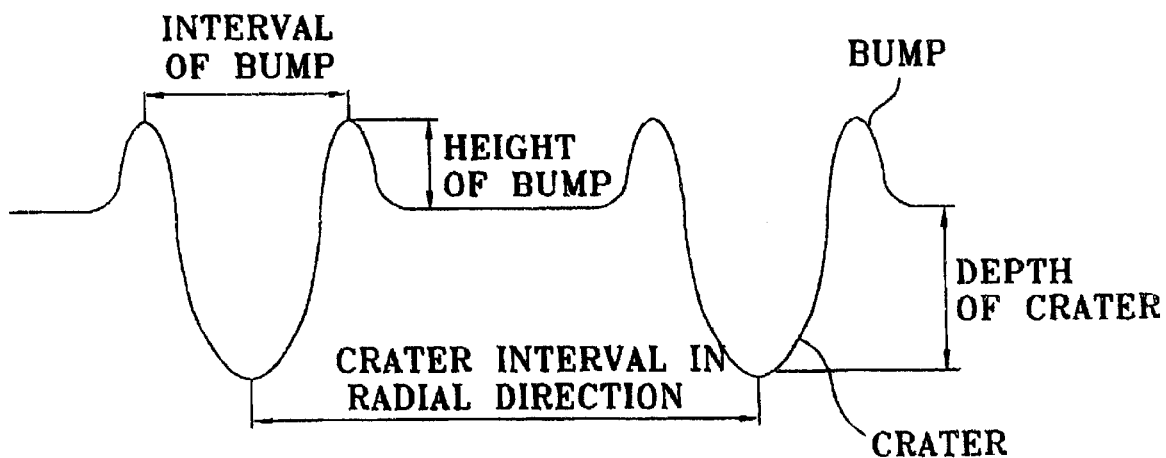
FIG. 4 shows a stamper for a textured structure according to an embodiment of the present invention.

FIG. 4 shows a stamper for the textured structure based on the above laser texturing according to the embodiment of the present invention. In FIG. 4, the height of the bumps formed on the stamper is 10~30 Å, the interval of the bumps is 20~30 μm, the depth of the craters is 20~40 Å, and the crater interval in the radial direction is 20~60 μm. In this case, the depth of the crater is much shallower than the groove depth of 500~700 Å, and the crater interval in the radial direction is much longer than the track pitch of 0.6~0.8 μm. The shape and dimension of the bumps and craters in the stamper have been measured by a TENCOR 3D stylus profiler.

The stamper for the textured structure formed by the above laser texturing is used and injection molded to produce a substrate on which V-shaped grooves are engraved. As a result, the substrate of the textured structure is formed.

After the substrate of the textured structure has been formed in this manner, a reflective film, an insulation film, a recording film and a protective film are in turn formed on the substrate. The reflective film, the insulation film, the recording film, the protective film and the lubricant film form a multilayer. The materials of the optical disc according to the present invention are the same as that of the existing optical disc, and the thickness of the substrate is 1.0~1.6 mm, that of the reflective film is 15~40 nm, that of the insulation film is 15~50 nm and those of the recording film and the protective film are 10~70 nm. If the protective film has been formed in this way, a lubricant oil is coated on the protective film by a spin coating, to thereby form a lubricant film (a model "Z-DOL" of Ausimount Inc.) of 2~3 nm thickness. A lubricant coating condition by the spin coating requires that a spraying time is 30 seconds at a rotation of 4000 RPM of the optical disc.

In this manner, the stamper for the V-shaped grooves is laser-textured, so that the textured structure is formed on the stamper. By injection molding using the stamper for the textured structure, a substrate having the textured structure is fabricated, and then the multilayer including a lubricant film is formed on the substrate which has been fabricated in the above manner, to thereby form an optical disc according to the embodiment of the present invention.

Figure 5:
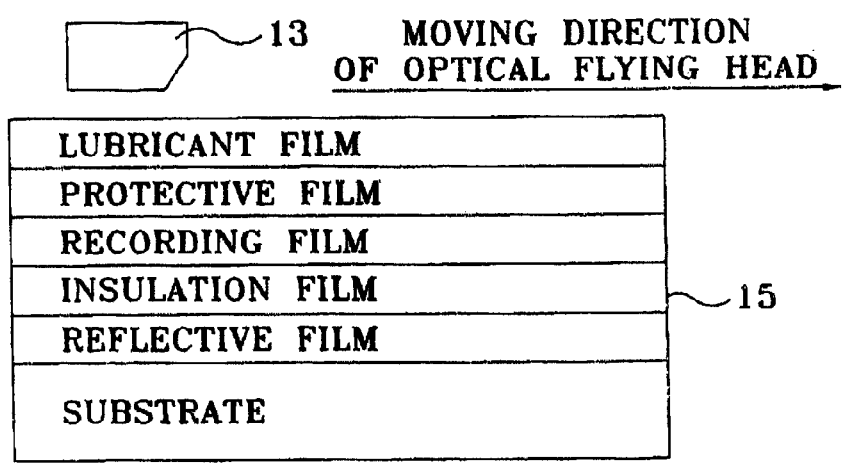
FIG. 5 shows an optical disc and a slider according to the embodiment present invention.

FIG. 5 shows an optical disc 15 according to the embodiment of the present invention and a slider 13 in an optical flying head floated on the surface of the optical disc 15, in which the slider 13 is floated above the lubricant film of the optical disc 15.

Figure 6:
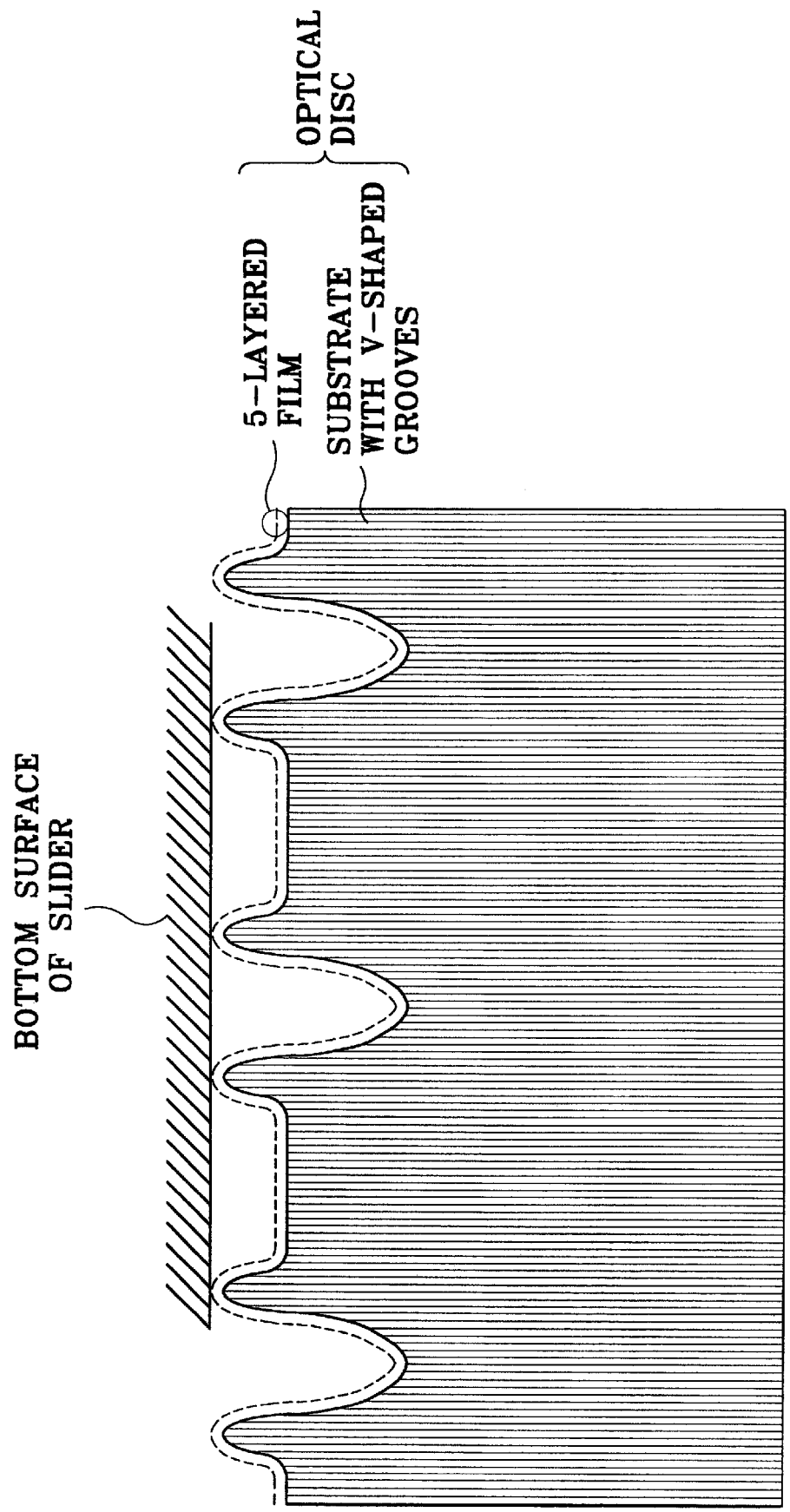
FIG. 6 shows a slider stopped at the surface of the optical disc according to the embodiment of the present invention.

FIG. 6 shows the optical disc 15 and a bottom surface of the slider 13 in an optical flying head stopped in the parking zone at the surface of the optical disc 15 according to the embodiment of the present invention. As shown, the slider 13 is positioned at a rest state on bumps of the optical disc 15 at a time when a drive of the slider 13 is stopped. If the slider 13 contacts the bumps on the optical disc 15, a contact area between the slider 13 and the optical disc 15 is reduced compared with the area where the slider 13 contacts the surface of the conventional optical disc 14, so that a stiction force is reduced between the slider 13 and the surface of the optical disc 15.

Figure 7:
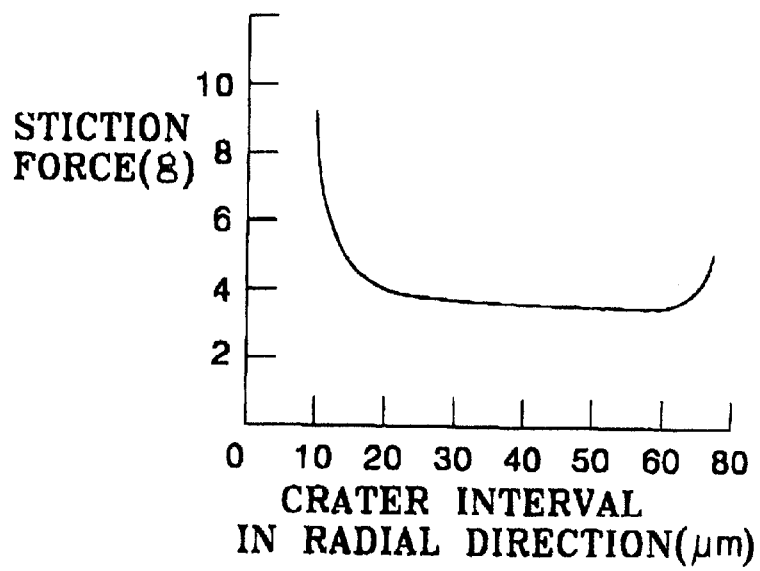
FIG. 7 is a graphical view showing a relationship of a stiction force with respect to a crater distance along a radial direction using the optical disc according to the embodiment of present invention.
Figure 8:
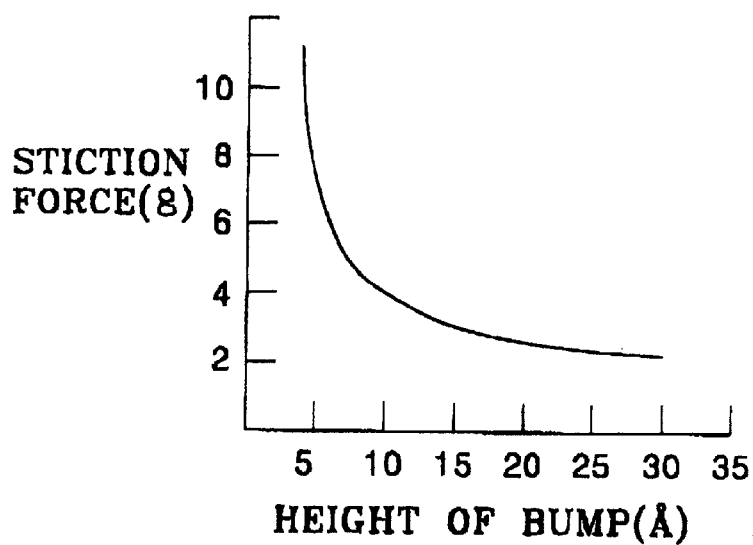
FIG. 8 is a graphical view showing a relationship of a stiction force with respect to a bump height using the optical disc according to the embodiment of the present invention.

FIGS. 7 and 8 show respective relationships of a stiction force with respect to the crater interval in the radial direction and with respect to the bump height, after a CSS (Contact Start-Stop) test has been performed in the optical disc 15. Here, during a CSS test, a linear velocity of the optical disc 15 should be kept at 5~30 m/s, and stopping and floating of the optical flying head has been repeated 500 times.

In FIG. 7, when the crater interval in the radial direction is 20~60 μm, it can be seen that the stiction force is 3.5~4 g. When the crater interval in the radial direction is smaller than 20 μm or larger than 60 μm, it can be seen that the stiction force becomes larger. Here, the depth of the craters is 40 Å, the height of the bumps is 20 Å, and the laser beam scanning interval on the stamper is 80 ns. In FIG. 8, when the bump height is 10~30 Å, it can be seen that the stiction force is 2.2~4 g. When the bump height is smaller than 10 Å, it can be seen that the stiction force becomes larger. Here, the depth of the craters is 20 Å, the crater interval in the radial direction is 40 μm, and the laser beam scanning interval on the stamper is 80 ns.

As can be seen from FIGS. 7 and 8, if the optical disc 15 having the textured structure is used, the stiction force between the optical flying head and the surface of the optical disc 15 is improved.

As described above, the optical disc having the textured structure enables an optical flying head to contact bumps on an optical disc. Accordingly, a mutual contact area is remarkably reduced and a stiction force due to the contact is reduced, thereby providing an effect of mitigating the stiction between a bottom surface of a slider of the optical flying head and a surface of the optical disc which at times is in contact with the bottom surface of the slider.

Although a preferred embodiment of the present invention has been shown and described, it would be appreciated by those skilled in the art that changes may be made in this embodiment without departing from the principles and spirit of the invention, the scope of which is defined in the claims and their equivalents.

What is claimed is:

1. An optical disc for an optical near-field recording using an optical flying head, the optical disc comprising;
    a substrate having a textured structure with a plurality of craters and bumps; and
    a multilayer formed on the substrate, on a topmost of which a lubricant film is formed, wherein the optical flying head is to contact the bumps.

2. The optical disc according to claim 1, wherein said substrate is formed by injection molding using a stamper having a textured structure formed of a number of craters and bumps.

3. The optical disc according to claim 1, wherein said substrate is formed by injection molding the substrate on which V-shaped grooves are engraved by said stamper.

4. The optical disc according to claim 2, wherein said stamper has a textured structure for V-shaped grooves which are laser-textured.

5. The optical disc according to claim 4, wherein said stamper for V-shaped grooves is attached to a movable spindle, laser textured by a laser source of Nd:YVO$_4$, a wavelength of the laser beam being approximately 1064 nm, a repetition rate of the laser beam being 10~100 kHz, a scanning interval of the laser beam being 20~80 ns and an energy of the laser beam being 0~40 mW.

6. The optical disc according to claim 2, wherein said stamper for the textured structure has the bumps with a bump height of 10~30 Å, a bump interval of 20~30 μm, has the craters of a crater depth of 20~40 Å, and a crater interval between the bumps in a radial direction of 20~60 μm.

7. The optical disc according to claim 6, wherein the crater depth is shallower than a depth of the V-shaped grooves and the crater interval in the radial direction of the optical disc is greater than a track pitch of the optical disc.

8. The optical disc according to claim 7, wherein the depth of the V-shaped grooves is 500~700 Å and the track pitch is 0.6~0.8 μm.

9. The optical disc according to claim 1, wherein said lubricant film is formed by a spin coating method.

10. The optical disc according to claim 9, wherein said spin coating method is accomplished by a 30-second spraying of a lubricant oil at approximately 4000 rotations per minute (RPM) of the optical disc.

11. The optical disc according to claim 9, wherein a thickness of said lubricant film is 2–3 nm.

12. A method of manufacturing an optical disc of a textured structure for an optical rear-field recording, comprising:
    forming a stamper for the textured structure having a number of craters and bumps;
    forming a substrate of the textured structure using the stamper; and
    forming a multilayer on the substrate on which the textured structure is formed, the multilayer having a lubricant film formed on a topmost of the multilayer, wherein a optical flying head is to contact the bumps.

13. The method according to claim 12, wherein the forming of the stamper comprises laser texturing the stamper for V-shaped grooves.

14. The method according to claim 13, wherein the forming of the stamper further comprises:
    attaching the stamper for V-shaped grooves to a movable spindle; and
    scanning a laser beam having a laser source of Nd:YVO$_4$, a wavelength of the laser beam being approximately 1064 nm, a repetition rate of the laser beam being 10~100 kHz, a scanning interval of the laser beam being 20~80 ns and an energy of the laser beam being 0~40 mW on the stamper for the V-shaped grooves.

15. The method according to claim 14, wherein the forming of the textured structure of the stamper comprises:
    forming a height of the bumps to 10–30 Å, forming an interval of the bumps to 20–30 μm, forming a depth of the craters to 20–40 Å, and forming a crater interval in a radial direction of the optical disc to be 20–60 μm.

16. The method according to claim 15, further comprising:
    forming the crater depth to be shallower than a depth of the V-shaped grooves; and
    forming the crater interval in a radial direction of the optical disc to be greater than a track pitch of the optical disc.

17. The method according to claim 16, further comprising:
    forming the grooves to a depth of 500–700 Å, and a track pitch of the optical disc to be 0.6–0.8 μm.

18. The method according to claim 12, wherein the forming the substrate comprises forming the substrate by injection molding.

19. The method according to claim 18, wherein the forming the substrate further comprises forming the substrate with V-shaped grooves through the injection molding.

20. The method according to claim 12, wherein the forming the multilayer comprises forming the lubricant film by spin coating.

21. The method according to claim 20, wherein the spin coating of the lubricant film comprises:
    rotating the optical disc at a rotation of approximately 4000 rotations per minute (RPM); and
    spraying a lubricant oil on the optical disc for approximately 30 seconds during the rotation of the optical disc to form the lubricant film on the topmost of the multilayer.

22. The method according to claim 20, wherein the forming the multilayer comprises forming the lubricant film to be a thickness of 2–3 nm.

* * * * *